(12) United States Patent
Achten et al.

(10) Patent No.: US 10,597,484 B2
(45) Date of Patent: *Mar. 24, 2020

(54) POLYISOCYANURATE PLASTICS HAVING HIGH THERMAL STABILITY

(71) Applicant: Covestro Deutschland AG, Leverkusen (DE)

(72) Inventors: Dirk Achten, Leverkusen (DE); Mathias Matner, Neuss (DE); Holger Casselmann, Odenthal (DE); Michael Ehlers, Krefeld (DE)

(73) Assignee: Covestro Deutschland AG, Leverkusen (DE)

(*) Notice: Subject to any disclaimer, the term of this patent is extended or adjusted under 35 U.S.C. 154(b) by 0 days.

This patent is subject to a terminal disclaimer.

(21) Appl. No.: 15/568,127

(22) PCT Filed: Apr. 21, 2016

(86) PCT No.: PCT/EP2016/058906
§ 371 (c)(1),
(2) Date: Oct. 20, 2017

(87) PCT Pub. No.: WO2016/170061
PCT Pub. Date: Oct. 27, 2016

(65) Prior Publication Data
US 2018/0086875 A1 Mar. 29, 2018

(30) Foreign Application Priority Data
Apr. 21, 2015 (EP) .................................. 15164522

(51) Int. Cl.
| C08G 18/79 | (2006.01) |
| C08G 18/02 | (2006.01) |
| C08G 18/72 | (2006.01) |
| C08G 18/22 | (2006.01) |
| C08G 18/09 | (2006.01) |
| C08G 18/73 | (2006.01) |
| C08G 18/75 | (2006.01) |
| C08G 18/78 | (2006.01) |
| C08G 18/32 | (2006.01) |
| G02B 1/04  | (2006.01) |

(52) U.S. Cl.
CPC ......... *C08G 18/792* (2013.01); *C08G 18/022* (2013.01); *C08G 18/027* (2013.01); *C08G 18/092* (2013.01); *C08G 18/225* (2013.01); *C08G 18/3206* (2013.01); *C08G 18/725* (2013.01); *C08G 18/73* (2013.01); *C08G 18/755* (2013.01); *C08G 18/7831* (2013.01); *G02B 1/041* (2013.01); *C08G 2105/02* (2013.01)

(58) Field of Classification Search
CPC .. C08G 18/792; C08G 18/022; C08G 18/027; G02B 1/041
See application file for complete search history.

(56) References Cited

U.S. PATENT DOCUMENTS

| 3,211,703 A | 10/1965 | Gilman et al. |
| 3,330,828 A | 7/1967 | Grogler et al. |
| 3,487,080 A | 12/1969 | Matsui et al. |
| 3,640,937 A | 2/1972 | Thoma et al. |
| 3,640,967 A | 2/1972 | König et al. |
| 3,658,746 A | 4/1972 | Rosendahl et al. |
| 3,996,223 A | 12/1976 | Gupta et al. |
| 4,040,992 A | 8/1977 | Bechara et al. |
| 4,255,569 A | 3/1981 | Müller et al. |
| 4,288,586 A | 9/1981 | Bock et al. |
| 4,324,879 A | 4/1982 | Bock et al. |
| 4,379,905 A * | 4/1983 | Stemmler ............ C08G 18/791 528/73 |
| 4,419,513 A | 12/1983 | Breidenbach et al. |
| 4,487,928 A | 12/1984 | Richter et al. |
| 4,499,253 A | 2/1985 | Kerimis et al. |
| 4,604,418 A | 8/1986 | Shindo et al. |

(Continued)

FOREIGN PATENT DOCUMENTS

| CA | 2034622 A1 | 8/1991 |
| CA | 2139535 A1 | 8/1995 |

(Continued)

OTHER PUBLICATIONS

Cinnamon, S., et al., "Adhesion Properties of Poly(Hexamethylene Diisocyanate) Obtained by Organotin Catalysis", European Polymer Journal, 1908, vol. 16, pp. 147-148.

Dabi, S., et al., "Foam Polymerization of Hexamethylene Diisocyanate by Cobalt Naphthenate", European Polymer Journal, 1982, vol. 18, pp. 549-553.

Dabi, S., et al., "Oligotrimerization of Hexamethylene Diisocyanate by Organometiallic Catalysts", European Polymer Journal, 1980, vol. 16, pp. 831-833.

Flipsen, T., "Design, Synthesis and Properties of New Materials Based on Densely Crosslinked Polymers for Polymer Optical Fiber and Amplifier Applications", Rijksuniversiteit Groningen, University of Groningen, 2000, pp. 1-231.

(Continued)

*Primary Examiner* — Michael L Leonard
(74) *Attorney, Agent, or Firm* — Drinker Biddle & Reath LLP

(57) ABSTRACT

The present invention relates to a polyisocyanurate plastic obtainable by catalytic trimenzation of a polyisocyanate composition A) which contains oligomeric polyisocyanates and is low in monomeric diisocyanates, where the isocyanurate structure content in the polyisocyanate composition A) is at least 50 mol %, based on the sum total of the oligomeric structures from the group consisting of uretdione, isocyanurate, allophanate, biuret, iminooxadiazinedione and oxadiazinetrione structure that are present in the polyisocyanate composition A). The present invention further relates to a transparent element comprising or consisting of the polyisocyanurate plastic. The invention likewise relates to a process for producing the polyisocyanurate plastics.

2 Claims, No Drawings

(56) References Cited

U.S. PATENT DOCUMENTS

| | | | |
|---|---|---|---|
| 4,613,686 A | 9/1986 | König et al. | |
| 4,789,705 A | 12/1988 | Kase et al. | |
| 4,808,691 A | 2/1989 | König et al. | |
| 4,837,359 A | 6/1989 | Woynar et al. | |
| 4,960,848 A | 10/1990 | Scholl et al. | |
| 4,994,541 A | 2/1991 | Dell et al. | |
| 5,013,838 A | 5/1991 | Scholl | |
| 5,064,960 A | 11/1991 | Pedain et al. | |
| 5,076,958 A | 12/1991 | Pedain et al. | |
| 5,489,663 A | 2/1996 | Brandt et al. | |
| 5,914,383 A | 6/1999 | Richter et al. | |
| 6,090,939 A | 7/2000 | Richter et al. | |
| 6,133,397 A | 10/2000 | O'Connor et al. | |
| 6,251,985 B1 | 6/2001 | Wamprecht et al. | |
| 6,613,863 B2 | 9/2003 | Kohlstruk et al. | |
| 6,635,761 B1 | 10/2003 | Revelant et al. | |
| 6,765,111 B1 | 7/2004 | Pedain et al. | |
| 6,946,538 B2 * | 9/2005 | Bernard | C07D 229/00 252/182.2 |
| 8,119,799 B2 | 2/2012 | Binder et al. | |
| 2006/0155095 A1 * | 7/2006 | Daussin | C08G 18/022 528/45 |
| 2009/0234091 A1 * | 9/2009 | Richter | B01J 31/0267 528/51 |
| 2010/0056702 A1 * | 3/2010 | Grahl | C08G 18/022 524/539 |
| 2010/0292396 A1 * | 11/2010 | Binder | C08G 18/02 524/590 |
| 2011/0201709 A1 * | 8/2011 | Athey | C08G 18/022 521/128 |
| 2013/0303758 A1 | 11/2013 | Lucas et al. | |
| 2015/0158966 A1 | 6/2015 | Laas et al. | |
| 2017/0044296 A1 | 2/2017 | Harada | |

FOREIGN PATENT DOCUMENTS

| | | | | |
|---|---|---|---|---|
| CA | 2244486 | * | 2/1999 | C08G 18/22 |
| CA | 2244486 A1 | | 2/1999 | |
| CA | 2253119 A1 | | 5/1999 | |
| DE | 1570540 A1 | | 3/1970 | |
| DE | 1954093 A1 | | 6/1970 | |
| DE | 1902931 A1 | | 8/1970 | |
| DE | 1918204 A1 | | 9/1970 | |
| DE | 1670666 A1 | | 7/1971 | |
| DE | 1770245 A1 | | 10/1971 | |
| DE | 1770591 A1 | | 11/1971 | |
| DE | 1667309 A1 | | 9/1972 | |
| DE | 2414413 A1 | | 10/1975 | |
| DE | 2446440 A1 | | 4/1976 | |
| DE | 2452532 A1 | | 5/1976 | |
| DE | 2631733 A1 | | 2/1977 | |
| DE | 2641380 A1 | | 3/1978 | |
| DE | 3100263 A1 | | 8/1982 | |
| DE | 3219608 A1 | | 9/1983 | |
| DE | 3240613 A1 | | 5/1984 | |
| DE | 8711301 U1 | | 10/1987 | |
| DE | 3700209 A1 | | 7/1988 | |
| DE | 3717060 A1 | | 12/1988 | |
| DE | 3900053 A1 | | 7/1990 | |
| DE | 3928503 A1 | | 3/1991 | |
| DE | 10142816 A1 | | 7/2002 | |
| EP | 0003765 A1 | | 9/1979 | |
| EP | 0010589 A1 | | 5/1980 | |
| EP | 0013880 A1 | | 8/1980 | |
| EP | 0033581 A1 | | 8/1981 | |
| EP | 0047452 A1 | | 3/1982 | |
| EP | 0056158 A1 | | 7/1982 | |
| EP | 0056159 A1 | | 7/1982 | |
| EP | 0100129 A1 | | 2/1984 | |
| EP | 0102482 A2 | | 3/1984 | |
| EP | 0150769 A2 | | 8/1985 | |
| EP | 0330966 A2 | | 9/1989 | |
| EP | 0336205 A2 | | 10/1989 | |
| EP | 0339396 A1 | | 11/1989 | |
| EP | 0377177 A1 | | 7/1990 | |
| EP | 0379914 A2 | | 8/1990 | |
| EP | 0443167 A1 | | 8/1991 | |
| EP | 0496208 A2 | | 7/1992 | |
| EP | 0668271 A1 | | 8/1995 | |
| EP | 0671426 A1 | | 9/1995 | |
| EP | 0798299 A1 | | 10/1997 | |
| EP | 0896009 A1 | | 2/1999 | |
| EP | 0899282 A2 | | 3/1999 | |
| EP | 0916647 A2 | | 5/1999 | |
| EP | 0962455 A1 | | 12/1999 | |
| EP | 1229016 A2 | | 8/2002 | |
| EP | 1599526 A1 | | 11/2005 | |
| EP | 2159238 A1 | | 3/2010 | |
| EP | 2883895 A1 | | 6/2015 | |
| GB | 809809 A | | 3/1959 | |
| GB | 952931 A | | 3/1964 | |
| GB | 966338 A | | 8/1964 | |
| GB | 1145952 A | | 3/1969 | |
| GB | 1244416 A | | 9/1971 | |
| GB | 1335958 A | | 10/1973 | |
| GB | 1386399 A | | 3/1975 | |
| GB | 1391066 A | | 4/1975 | |
| GB | 1462597 A | | 1/1977 | |
| GB | 2221465 A | | 2/1990 | |
| GB | 2222161 A | | 2/1990 | |
| JP | 2001098042 A | | 4/2001 | |
| WO | WO-1999023128 A1 | | 5/1999 | |
| WO | WO-2004078820 A1 | | 9/2004 | |
| WO | WO-2005087828 A1 | | 9/2005 | |
| WO | WO-2013167404 A1 | | 11/2013 | |
| WO | WO-2015166983 A1 | | 11/2015 | |

OTHER PUBLICATIONS

Hakman, N., "Properties of Polyisocyanurate Resins Obtained by Polymerization of Hexamethylene Diisocyanate by Organotin Catalysts", European Polymer Journal, 1978, vol. 14, pp. 675-678.

Moritsugu, M., et al., "Cyclotrimerization of Diisocyanates Toward High-Performance Networked Polymers with Rigid Isocyanurate Structure: Combination of Aromatic and Aliphatic Diisocyanates for Tunable Flexibility", Journal of Polymer Science, 2013, vol. 51, pp. 2631-2637.

Schildknecht, C.E., et al., "Polymerization Processes", Wiley, New York, 1977, pp. 665-667.

International Preliminary Report on Patentability for PCT/EP2016/058901 dated Oct. 24, 2017.

International Preliminary Report on Patentability for PCT/EP2016/058902 dated Oct. 24, 2017.

International Preliminary Report on Patentability for PCT/EP2016/058904 dated Oct. 24, 2017.

International Preliminary Report on Patentability for PCT/EP2016/058905 dated Oct. 24, 2017.

International Preliminary Report on Patentability for PCT/EP2016/058906 dated Oct. 24, 2017.

International Search Report for PCT/EP2016/058901 dated Jun. 30, 2016.

International Search Report for PCT/EP2016/058902 dated Jul. 14, 2016.

International Search Report for PCT/EP2016/058904 dated Jul. 13, 2016.

International Search Report for PCT/EP2016/058905 dated Jul. 8, 2016.

International Search Report for PCT/EP2016/058906 dated Jul. 13, 2016.

Written Opinion of the International Searching Authority for PCT/EP2016/058901 dated Jun. 30, 2016.

Written Opinion of the International Searching Authority for PCT/EP2016/058902 dated Jul. 14, 2016.

Written Opinion of the International Searching Authority for PCT/EP2016/058904 dated Jul. 13, 2016.

Written Opinion of the International Searching Authority for PCT/EP2016/058905 dated Jul. 8, 2016.

(56) References Cited

OTHER PUBLICATIONS

Written Opinion of the International Searching Authority for PCT/EP2016/058906 dated Jul. 13, 2016.

* cited by examiner

POLYISOCYANURATE PLASTICS HAVING HIGH THERMAL STABILITY

CROSS-REFERENCE TO RELATED APPLICATIONS

This application is a national stage application (under 35 U.S.C. § 371) of PCT/EP2016/058906, filed Apr. 21, 2016, which claims benefit of European Application No. 15164522.3, filed Apr. 21, 2015, both of which are incorporated herein by reference in their entirety.

The present invention relates to polyisocyanurate plastics obtainable by catalytic trimerization of a polyisocyanate composition A), and to a transparent element comprising or consisting of the polyisocyanurate plastic. The invention likewise relates to a process for producing the polyisocyanurate plastics.

BACKGROUND OF THE INVENTION

Production of transparent elements such as clearcoats, films, vessels, packaging materials, encapsulation materials, optical fibres, light diffusers or lenses requires materials that are transparent, i.e. have maximum transparency to electromagnetic waves, especially within the spectral range visible to humans from 400 to 800 nm. In a number of applications in the chemical, medical and food and drink sector, transparent elements having high heat distortion and colour stabilities are particularly advantageous. At high typical use temperatures as occur, for example, in the case of use in the presence of chemical processes or in the sterilization of food and drink products and medical products, high-stability transparent materials having good heat distortion and colour stabilities even into the UV-A range are desirable, since thermal yellowing is always the first sign of an unwanted ageing process and degradation process. A further example of the need for transparent and heat- and colour-stable elements is encountered in the field of lighting and solar energy generation, for example in the coating and glazing of photovoltaic solar modules, and in reflective mirror films and Fresnel lenses in concentrator modules which can be exposed to high temperatures frequently and over long periods. Even in the case of many light sources such as incandescent lamps, but also in the case of LEDs, where considerable amounts of heat arise during the generation of light, it is of considerable importance that the transparent elements and the materials used for production thereof have high thermal durability and mechanical stability. Specifically, this means that the materials must not deform or must not become discoloured even in the event of significant heating, for example, since the function of a lens, for instance, can otherwise be lost. At the same time, they also have to have sufficient hardness at normal temperatures, in order that they withstand mechanical stresses.

The increasing use of LEDs as light sources has additionally generated a considerable demand for novel materials which firstly meet the above demands and secondly are suitable for encapsulation or potting of LEDs.

The thesis by Theo Flipsen: "*Design, synthesis and properties of new materials based on densely crosslinked polymers for polymer optical fiber and amplifier applications*", Rijksuniversiteit Groningen, 2000 describes the polytrimerization of monomeric HDI with a neodymium/crown ether complex as catalyst. The polyisocyanurate obtained, which is said to have good optical, thermal and mechanical properties, was studied in the context of the thesis for its suitability for optical applications, especially as polymeric optical fibres.

However, processes known from the prior art for production of polyisocyanurate plastics from monomeric aliphatic diisocyanates have the fundamental disadvantage that a considerable shrinkage in volume occurs in the course of a trimerization reaction. Moreover, it is a common factor in the production processes for polyisocyanurate plastics which proceed from the monomeric diisocyanates and are known from the prior art that they are very time-consuming and take place in closed systems under complex temperature control.

WO 2015/166983 discloses the use of isocyanurate polymers for encapsulating LEDs. The use of carboxylates and alkoxides of alkali metals, alkaline earth metals or zirconium, in combination with complexing agents such as crown ethers or polyethylene glycols or polypropylene glycols, and organic tin compounds is not disclosed.

U.S. Pat. No. 6,133,397 only discloses coatings made by trimerizing oligomeric polyisocyanates. It does not disclose the production of solid bodies.

The problem addressed by the present invention was therefore that of providing a material which is transparent and has high thermal durability and thermal colour stability. In addition, the material should at the same time have low volume shrinkage and be producible by an efficient process.

BRIEF SUMMARY OF THE INVENTION

This object is achieved in accordance with the invention by a polyisocyanurate plastic obtainable by catalytic trimerization of a polyisocyanate composition A) which contains oligomeric polyisocyanates and is low in monomeric diisocyanates, where the isocyanurate structure content in the polyisocyanate composition A) is at least 50 mol %, based on the sum total of the oligomeric structures from the group consisting of uretdione, isocyanurate, allophanate, biuret, iminooxadiazinedione and oxadiazinetrione structure that are present in the polyisocyanate composition A).

The invention also further provides the process from which the polyisocyanurate plastics of the invention are obtainable. This comprises the following steps:

a) providing a polyisocyanate composition A) which contains oligomeric polyisocyanates and is low in monomeric diisocyanates, wherein the isocyanurate structure content in the polyisocyanate composition A) is at least 50 mol %, based on the sum total of the oligomeric structures from the group consisting of uretdione, isocyanurate, allophanate, biuret, iminooxadiazinedione and oxadiazinetrione structures that are present in the polyisocyanate composition A);
b) catalytically trimerizing the polyisocyanate composition A).

DETAILED DESCRIPTION OF THE INVENTION

The embodiments and areas of preference mentioned apply equally to the polyisocyanurate plastic of the invention and the process of the invention for production thereof.

The invention described in detail hereinafter is based on the surprising observation that catalytic trimerization of low-monomer oligomeric polyisocyanate compositions affords novel polyisocyanurate plastics having many advantageous properties.

Thus, the plastics obtained are transparent and have high thermal durability and thermal colour stability, and are therefore especially suitable for encapsulation of light sources such as LEDs. In addition, the polyisocyanurate plastic at the same time has low volume shrinkage and is producible by an efficient process.

The use of low-monomer oligomeric polyisocyanate compositions rather than monomeric polyisocyanates as starting materials for production of polyisocyanurate plastics additionally has the advantage that, because of the comparatively low isocyanate contents of the oligomeric reactants, much less heat of reaction has to be removed during the curing. Moreover, the use of low-monomer polyisocyanate compositions containing oligomeric polyisocyanates as oligomeric reactants for the trimerization reaction also leads to a novel crosslinking structure in the polyisocyanurate plastic obtainable, which distinguishes it structurally from the materials known from the prior art.

In the context of the present invention, the term "transparent" is understood to mean that the transparent body, at a thickness of 4 mm, determined to ASTM-D 1003, has a transmittance of 70%. However, this transmittance value can deviate from the aforementioned value of 70% in the case of optional additional use of UV stabilizers and dyes.

A "polyisocyanurate plastic" as used here is a polymer containing polyisocyanurate. It may also consist predominantly or entirely of a polyisocyanurate. Blends of polyisocyanurates and other plastics are likewise covered by the term "polyisocyanurate plastic" as used here.

When reference is made here to "plastic", this means a product which is very substantially dimensionally stable at room temperature—in contrast, for example, to gels or liquids. The term "plastic" as used here encompasses all standard classes of plastic, i.e. especially including thermosets, thermoplastics and elastomers.

A "polyisocyanurate" as used here is any molecule, preferably a polymer, having a plurality of isocyanurate structural units, for example at least ten isocyanurate structural units. A molecule having a single isocyanurate structural unit can be referred to as "isocyanurate".

The characteristic cyclic isocyanurate structural unit is shown in the following structural formula:

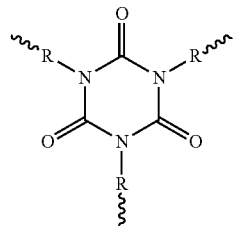

Isocyanurates and polyisocyanurates can be obtained by cyclotrimerization of polyisocyanates. The conventionally operated cyclotrimerization proceeding from monomeric diisocyanates is—as described above—a strongly exothermic reaction. This can considerably restrict the use options and the levels of trimerization that are still achievable industrially and efficiently.

The term "polyisocyanate" as used here is a collective term for compounds containing two or more isocyanate groups in the molecule (this is understood by the person skilled in the art to mean free isocyanate groups of the general structure —N=C=O). The simplest and most important representatives of these polyisocyanates are the diisocyanates. These have the general structure O=C=N—R—N=C=O where R typically represents aliphatic, alicyclic and/or aromatic radicals.

Because of the polyfunctionality (≥2 isocyanate groups), it is possible to use polyisocyanates to prepare a multitude of polymers (e.g. polyurethanes, polyureas and polyisocyanurates) and low molecular weight compounds (for example those having uretdione, isocyanurate, allophanate, biuret, iminooxadiazinedione and/or oxadiazinetrione structure).

When general reference is made here to "polyisocyanates", this means monomeric and/or oligomeric polyisocyanates alike. For understanding of many aspects of the invention, however, it is important to distinguish between monomeric diisocyanates and oligomeric polyisocyanates. When reference is made here to "oligomeric polyisocyanates", this means polyisocyanates formed from at least two diisocyanate molecules, i.e. compounds that constitute or contain a reaction product formed from at least two diisocyanate molecules.

The preparation of oligomeric polyisocyanates from monomeric diisocyanates is also referred to here as modification of monomeric diisocyanates. This "modification" as used here means the reaction of monomeric diisocyanates to give oligomeric polyisocyanates having uretdione, isocyanurate, allophanate, biuret, iminooxadiazinedione and/or oxadiazinetrione structure.

For example, hexamethylene diisocyanate (HDI) is a "monomeric diisocyanate" since it contains two isocyanate groups and is not a reaction product of at least two polyisocyanate molecules:

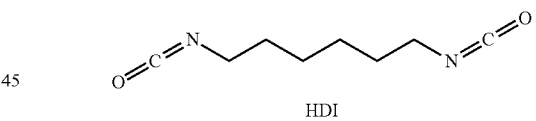

HDI

Reaction products which are formed from at least two HDI molecules and still have at least two isocyanate groups, by contrast, are "oligomeric polyisocyanates" within the context of the invention. Representatives of such "oligomeric polyisocyanates" are, proceeding from monomeric HDI, for example, HDI isocyanurate and HDI biuret, each of which are formed from three monomeric HDI units:

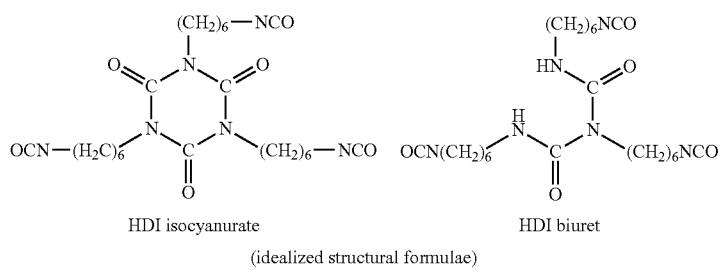

HDI isocyanurate      HDI biuret (idealized structural formulae)

"Polyisocyanate composition A)" in the context of the invention refers to the isocyanate component in the initial reaction mixture. In other words, this is the sum total of all the compounds in the initial reaction mixture that have isocyanate groups. The polyisocyanate composition A) is thus used as reactant for production of the polyisocyanurate plastic of the invention. When reference is made here to "polyisocyanate composition A)", especially to "providing the polyisocyanate composition A)", this means that the polyisocyanate composition A) exists and is used as reactant.

According to the invention, the polyisocyanate composition A) used in the trimerization is low in monomers (i.e. low in monomeric diisocyanates) and contains oligomeric polyisocyanates. In one embodiment of the invention, the polyisocyanate composition A) consists entirely or to an extent of 80%, 85%, 90%, 95%, 98%, 99% or 99.5% by weight, based in each case on the weight of the polyisocyanate composition A), of oligomeric polyisocyanates. This content of oligomeric polyisocyanates is based on the polyisocyanate composition A).

"Low in monomers" and "low in monomeric diisocyanates" are used synonymously here in relation to the polyisocyanate composition A).

Results of particular practical relevance are established when the polyisocyanate composition A) has a proportion of monomeric diisocyanates in the polyisocyanate composition A) of not more than 20% by weight, especially not more than 15% by weight or not more than 10% by weight, based in each case on the weight of the polyisocyanate composition A). Preferably, the polyisocyanate composition A) has a content of monomeric diisocyanates of not more than 5% by weight, especially not more than 2.0% by weight, more preferably not more than 1.0% by weight, based in each case on the weight of the polyisocyanate composition A). Particularly good results are established when the polymer composition A) is essentially free of monomeric polyisocyanates. "Essentially free" means that the content of monomeric polyisocyanates is not more than 0.5% by weight, based on the weight of the polyisocyanate composition A).

It is essential to the invention that the polyisocyanate composition A) used is a low-monomer composition. In practice, this can especially be achieved by using, as polyisocyanate composition A), oligomeric polyisocyanates whose preparation involves, after the actual modification reaction, at least one further process step in each case for removal of the unconverted excess monomeric diisocyanates. In a manner of particular practical relevance, this monomer removal can be effected by processes known per se, preferably by thin-film distillation under high vacuum or by extraction with suitable solvents that are inert toward isocyanate groups, for example aliphatic or cycloaliphatic hydrocarbons such as pentane, hexane, heptane, cyclopentane or cyclohexane.

In a preferred embodiment of the invention, the polyisocyanate composition A) of the invention is obtained by modification of monomeric diisocyanates with subsequent removal of unconverted monomers.

Preferably, no monomeric diisocyanate is used in the trimerization reaction used for production of the polyisocyanurate plastics of the invention. In a particular embodiment of the invention, however, the polyisocyanate composition A) may contain an extra monomeric diisocyanate. In this context, "extra monomeric diisocyanate" means that it differs from the monomeric diisocyanates which have been used for preparation of the oligomeric polyisocyanates present in the polyisocyanate composition A). Addition of extra monomeric diisocyanate may be advantageous for achievement of special technical effects, for example an exceptional hardness. Results of particular practical relevance are established when the polyisocyanate composition A) has a proportion of extra monomeric diisocyanate in the polyisocyanate composition A) of not more than 20% by weight, especially not more than 15% by weight or not more than 10% by weight, based in each case on the weight of the polyisocyanate composition A). Preferably, the polyisocyanate composition A) has a content of extra monomeric diisocyanate of not more than 5% by weight, especially not more than 2.0% by weight, more preferably not more than 1.0% by weight, based in each case on the weight of the polyisocyanate composition A).

In a further particular embodiment of the invention, the polyisocyanate composition A) may contain monomeric monoisocyanates or monomeric isocyanates having an isocyanate functionality greater than two, i.e. having more than two isocyanate groups per molecule. The addition of monomeric monoisocyanates or monomeric isocyanates having an isocyanate functionality greater than two has been found to be particularly advantageous in order to influence the network density of the polyisocyanurate plastic. Results of particular practical relevance are established when the polyisocyanate composition A) has a proportion of monomeric monoisocyanates or monomeric isocyanates having an isocyanate functionality greater than two in the polyisocyanate composition A) of not more than 20% by weight, especially not more than 15% by weight or not more than 10% by weight, based in each case on the weight of the polyisocyanate composition A). Preferably, the polyisocyanate composition A) has a content of monomeric monoisocyanates or monomeric isocyanates having an isocyanate functionality greater than two of not more than 5% by weight, especially not more than 2.0% by weight, more preferably not more than 1.0% by weight, based in each case on the weight of the polyisocyanate composition A). Preferably, no monomeric monoisocyanate or monomeric isocyanate having an isocyanate functionality greater than two is used in the inventive trimerization reaction.

The low-monomer polyisocyanate composition A) and the oligomeric polyisocyanates present therein are typically obtained by modifying simple aliphatic, cycloaliphatic, araliphatic and/or aromatic monomeric diisocyanates or mixtures of such monomeric diisocyanates.

The oligomeric polyisocyanates may, in accordance with the invention, especially have uretdione, isocyanurate, allophanate, biuret, iminooxadiazinedione and/or oxadiazinetrione structure. In one embodiment of the invention, the oligomeric polyisocyanates have at least one of the following oligomeric structure types or mixtures thereof:

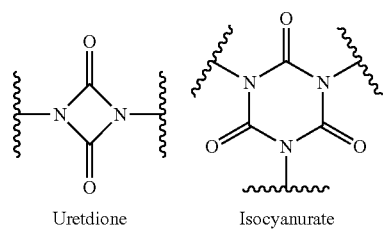

Uretdione    Isocyanurate

-continued

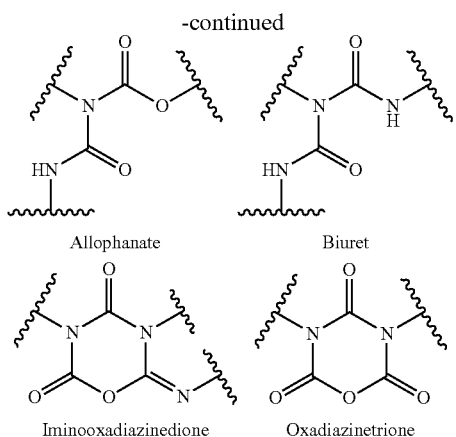

Allophanate  Biuret
Iminooxadiazinedione  Oxadiazinetrione

It has been found that, surprisingly, it is advantageous, for the polyisocyanurate plastic of the invention, to use a polyisocyanate composition A) wherein the isocyanurate structure content is at least 50 mol %, based on the sum total of the oligomeric structures from the group consisting of uretdione, isocyanurate, allophanate, biuret, iminooxadiazinedione and oxadiazinetrione structure that are present in the polyisocyanate composition A).

In a preferred embodiment of the invention, a polymer composition A) is used wherein the isocyanurate structure content is at least 60 mol %, preferably 70 mol %, more preferably 80 mol %, especially preferably 90 mol % and particularly 95 mol %, based on the sum total of the oligomeric structures present from the group consisting of uretdione, isocyanurate, allophanate, biuret, iminooxadiazinedione and oxadiazinetrione structure in the polyisocyanate composition A).

In an additional or alternative embodiment, in accordance with the invention, a polyisocyanate composition A) is used which, as well as the isocyanurate structure, comprises at least one further oligomeric polyisocyanate having uretdione, allophanate, biuret, iminooxadiazinedione or oxadiazinetrione structure or mixtures thereof.

In an especially preferred embodiment of the present invention, the polyisocyanate composition A) has at least one structure selected from the group consisting of uretdione, isocyanurate, biuret, iminooxadiazinedione and/or oxadiazinetrione, but is essentially free of allophanate structures. The term "essentially free of allophanate structures" refers to a ratio of isocyanurate groups to allophanate groups of more than 99:1. All other definitions given above with the exception of the allophanate-content also apply to this embodiment.

The study underlying the present invention has surprisingly shown that contrary to the teaching of WO 2015/166983 polyisocyanurate plastics with satisfactory technical properties can be produced from polyisocyanates which do not contain allophanate groups.

The proportions of uretdione, isocyanurate, allophanate, biuret, iminooxadiazinedione and/or oxadiazinetrione structure in the polyisocyanates A) can be determined, for example, by NMR spectroscopy. It is possible here with preference to use $^{13}C$ NMR spectroscopy, preferably in proton-decoupled form, since the oligomeric structures mentioned give characteristic signals.

Irrespective of the underlying oligomeric structure (uretdione, isocyanurate, allophanate, biuret, iminooxadiazinedione and/or oxadiazinetrione structure), the polyisocyanate composition A) and/or the oligomeric polyisocyanates present therein preferably have/has a (mean) NCO functionality of 2.0 to 5.0, preferably of 2.3 to 4.5.

Results of particular practical relevance are established when the polyisocyanate composition A) for use in accordance with the invention has a content of isocyanate groups of 8.0% to 28.0% by weight, preferably of 14.0% to 25.0% by weight, based in each case on the weight of the polyisocyanate composition A).

Preparation processes for the oligomeric polyisocyanates having uretdione, isocyanurate, allophanate, biuret, iminooxadiazinedione and/or oxadiazinetrione structure for use in accordance with the invention in the polyisocyanate composition A) are described, for example, in J. Prakt. Chem. 336 (1994) 185-200, in DE-A 1 670 666, DE-A 1 954 093, DE-A 2 414 413, DE-A 2 452 532, DE-A 2 641 380, DE-A 3 700 209, DE-A 3 900 053 and DE-A 3 928 503 or in EP-A 0 336 205, EP-A 0 339 396 and EP-A 0 798 299.

In an additional or alternative embodiment of the invention, the polyisocyanate composition A) of the invention is defined in that it contains oligomeric polyisocyanates which have been obtained from monomeric diisocyanates, irrespective of the nature of the modification reaction used, with observation of an oligomerization level of 5% to 45%, preferably 10% to 40%, more preferably 15% to 30%. "Oligomerization level" is understood here to mean the percentage of isocyanate groups originally present in the starting mixture which is consumed during the preparation process to form uretdione, isocyanurate, allophanate, biuret, iminooxadiazinedione and/or oxadiazinetrione structures.

Suitable polyisocyanates for preparation of the polyisocyanate composition A) for use in the process of the invention and the oligomeric polyisocyanates present therein are any desired polyisocyanates obtainable in various ways, for example by phosgenation in the liquid or gas phase or by a phosgene-free route, for example by thermal urethane cleavage. Particularly good results are established when the polyisocyanates are monomeric diisocyanates. Preferred monomeric diisocyanates are those having a molecular weight in the range from 140 to 400 g/mol, having aliphatically, cycloaliphatically, araliphatically and/or aromatically bonded isocyanate groups, for example 1,4-diisocyanatobutane (BDI), 1,5-diisocyanatopentane (PDI), 1,6-diisocyanatohexane (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,4-diisocyanato-3,3,5-trimethylcyclohexane, 1,3-diisocyanato-2-methylcyclohexane, 1,3-diisocyanato-4-methylcyclohexane, 1-isocyanato-3,3,5-trimethyl-5-isocyanatomethylcyclohexane (isophorone diisocyanate; IPDI), 1-isocyanato-1-methyl-4(3)-isocyanatomethylcyclohexane, 2,4'- and 4,4'-diisocyanatodicyclohexylmethane (H12MDI), 1,3- and 1,4-bis(isocyanatomethyl)cyclohexane, bis(isocyanatomethyl) norbornane (NBDI), 4,4'-diisocyanato-3,3'-dimethyldicyclohexylmethane, 4,4'-diisocyanato-3,3',5,5'-tetramethyldicyclohexylmethane, 4,4'-diisocyanato-1,1'-bi (cyclohexyl), 4,4'-diisocyanato-3,3'-dimethyl-1,1'-bi (cyclohexyl), 4,4'-diisocyanato-2,2',5,5'-tetramethyl-1,1'-bi (cyclohexyl), 1,8-diisocyanato-p-menthane, 1,3-diisocyanatoadamantane, 1,3-dimethyl-5,7-diisocyanatoadamantane, 1,3- and 1,4-bis (isocyanatomethyl)benzene (xylylene diisocyanate; XDI), 1,3- and 1,4-bis(1-isocyanato-1-methylethyl)benzene (TMXDI) and bis(4-(1-isocyanato-1-methylethyl)phenyl) carbonate, 2,4- and 2,6-diisocyanatotoluene (TDI), 2,4'- and 4,4'-diisocyanatodiphenylmethane (MDI), 1,5-diisocyanatonaphthalene and any desired mixtures of such diisocyanates. Further diisocyanates that are likewise suitable can additionally be found, for example, in Justus Liebigs *Annalen der Chemie, volume* 562 (1949) p. 75-136.

Suitable monomeric monoisocyanates which can optionally be used in the polyisocyanate composition A) are, for example, n-butyl isocyanate, n-amyl isocyanate, n-hexyl isocyanate, n-heptyl isocyanate, n-octyl isocyanate, undecyl isocyanate, dodecyl isocyanate, tetradecyl isocyanate, cetyl isocyanate, stearyl isocyanate, cyclopentyl isocyanate, cyclohexyl isocyanate, 3- or 4-methylcyclohexyl isocyanate or any desired mixtures of such monoisocyanates. An example of a monomeric isocyanate having an isocyanate functionality greater than two which can optionally be added to the polyisocyanate composition A) is 4-isocyanatomethyloctane 1,8-diisocyanate (triisocyanatononane; TIN).

In one embodiment of the invention, the polyisocyanate composition A) contains not more than 30% by weight, especially not more than 20% by weight, not more than 15% by weight, not more than 10% by weight, not more than 5% by weight or not more than 1% by weight, based in each case on the weight of the polyisocyanate composition A), of aromatic polyisocyanates. As used here, "aromatic polyisocyanate" means a polyisocyanate having at least one aromatically bonded isocyanate group.

Aromatically bonded isocyanate groups are understood to mean isocyanate groups bonded to an aromatic hydrocarbyl radical.

In a preferred embodiment of the invention, a polyisocyanate composition A) having exclusively aliphatically and/or cycloaliphatically bonded isocyanate groups is used.

Aliphatically and cycloaliphatically bonded isocyanate groups are understood to mean isocyanate groups bonded, respectively, to an aliphatic and cycloaliphatic hydrocarbyl radical.

In another preferred embodiment of the invention, a polyisocyanate composition A) consisting of or comprising one or more oligomeric polyisocyanates is used, where the one or more oligomeric polyisocyanates has/have exclusively aliphatically and/or cycloaliphatic bonded isocyanate groups.

In a further embodiment of the invention, the polyisocyanate composition A) consists to an extent of at least 70%, 80%, 85%, 90%, 95%, 98% or 99% by weight, based in each case on the weight of the polyisocyanate composition A), of polyisocyanates having exclusively aliphatically and/or cycloaliphatically bonded isocyanate groups. Practical experiments have shown that particularly good results can be achieved with polyisocyanate compositions A) in which the oligomeric polyisocyanates present therein have exclusively aliphatically and/or cycloaliphatically bonded isocyanate groups.

In a particularly preferred embodiment, a polyisocyanate composition A) is used which consists of or comprises one or more oligomeric polyisocyanates, where the one or more oligomeric polyisocyanates is/are based on 1,4-diisocyanatobutane (BDI), 1,5-diisocyanatopentane (PDI), 1,6-diisocyanatohexane (HDI), isophorone diisocyanate (IPDI) or 4,4'-diisocyanatodicyclohexylmethane (H12MDI) or mixtures thereof.

In a further embodiment of the invention, the proportion of isocyanurate structures in the polyisocyanurate plastic obtained by the process of the invention is at least 20% by weight, based on the weight of the polyisocyanurate plastic. The proportion of isocyanurate structures in the polyisocyanurate plastic obtained can be determined, for example, via solid-state $^{13}$C NMR.

In a further embodiment of the invention, polyisocyanate compositions A) having a viscosity greater than 500 mPas and less than 500 000 mPas, preferably greater than 750 mPas and less than 300 000 mPas, and particularly preferred greater than 1000 mPas and less than 200 000 mPas, measured to DIN EN ISO 3219 at 21° C., are used.

The polyisocyanurates of the invention are obtainable by catalytic trimerization. "Catalytic" here means in the presence of a suitable catalyst B).

Suitable catalysts B) for the process in accordance with the invention are in principle any compounds which accelerate the trimerization of isocyanate groups to isocyanurate structures. Since isocyanurate formation, depending on the catalyst used, is frequently accompanied by side reactions, for example dimerization to give uretdione structures or trimerization to form iminooxadiazinediones (called asymmetric trimers), and, in the presence of urethane groups in the starting polyisocyanate, by allophanatization reactions, the term "trimerization" in the context of the present invention is also to be used synonymously for these oligomerization reactions that proceed additionally.

In a particular embodiment, however, trimerization means that predominantly cyclotrimerizations of at least 50%, preferably at least 60%, more preferably at least 70% and especially at least 80% of isocyanate groups present in the polyisocyanate composition A) to give isocyanurate structural units are catalysed. However, side reactions, especially those to give uretdione, allophanate and/or iminooxadiazinedione structures, typically occur and can even be used in a controlled manner in order to advantageously affect, for example, the Tg value of the polyisocyanurate plastic obtained.

Suitable catalysts B) for the process of the invention are, for example, simple tertiary amines, for example triethylamine, tributylamine, N,N-dimethylaniline, N-ethylpiperidine or N,N'-dimethylpiperazine. Suitable catalysts are also the tertiary hydroxyalkylamines described in GB 2 221 465, for example triethanolamine, N-methyldiethanolamine, dimethylethanolamine, N-isopropyldiethanolamine and 1-(2-hydroxyethyl)pyrrolidine, or the catalyst systems that are known from GB 2 222 161 and consist of mixtures of tertiary bicyclic amines, for example DBU, with simple low molecular weight aliphatic alcohols.

Likewise suitable as trimerization catalysts B) for the process of the invention are a multitude of different metal compounds. Suitable examples are the octoates and naphthenates of manganese, iron, cobalt, nickel, copper, zinc, zirconium, cerium or lead that are described as catalysts in DE-A 3 240 613, or mixtures thereof with acetates of lithium, sodium, potassium, calcium or barium, the sodium and potassium salts of linear or branched alkanecarboxylic acids having up to 10 carbon atoms that are known from DE-A 3 219 608, for example of propionic acid, butyric acid, valeric acid, caproic acid, heptanoic acid, caprylic acid, pelargonic acid, capric acid and undecyl acid, the alkali metal or alkaline earth metal salts of aliphatic, cycloaliphatic or aromatic mono- and polycarboxylic acids having 2 to 20 carbon atoms that are known from EP-A 0 100 129, for example sodium or potassium benzoate, the alkali metal phenoxides known from GB-A 1 391 066 and GB-A 1 386 399, for example sodium or potassium phenoxide, the alkali metal and alkaline earth metal oxides, hydroxides, carbonates, alkoxides and phenoxides known from GB 809 809, alkali metal salts of enolizable compounds and metal salts of weak aliphatic or cycloaliphatic carboxylic acids, for example sodium methoxide, sodium acetate, potassium acetate, sodium acetoacetate, lead 2-ethylhexanoate and lead naphthenate, the basic alkali metal compounds complexed with crown ethers or polyether alcohols that are known from EP-A 0 056 158 and EP-A 0 056 159, for example complexed sodium or potassium carboxylates, the pyrrolidinone-potassium salt known from EP-A 0 033 581, the mono- or polynuclear complex of titanium, zirconium and/or hafnium known from application EP 13196508.9, for example zirconium tetra-n butoxide, zirconium tetra-2-ethylhexanoate and zirconium tetra-2-ethylhexoxide, and tin compounds of the type described in *European Polymer Journal, vol.* 16, 147-148 (1979), for example dibutyltin dichloride, diphenyltin dichloride, triphenylstannanol, tributyltin acetate, tributyltin oxide, tin octoate, dibutyl(dimethoxy)stannane and tributyltin imidazolate.

Further trimerization catalysts B) suitable for the process of the invention are, for example, the quaternary ammonium hydroxides known from DE-A 1 667 309, EP-A 0 013 880 and EP-A 0 047 452, for example tetraethylammonium hydroxide, trimethylbenzylammonium hydroxide, N,N-dimethyl-N-dodecyl-N-(2-hydroxyethyl)ammonium hydroxide, N-(2-hydroxyethyl)-N,N-dimethyl-N-(2,2'-dihydroxymethylbutyl)ammonium hydroxide and 1-(2-hydroxyethyl)-1,4-diazabicyclo[2.2.2]octane hydroxide (monoadduct of ethylene oxide and water with 1,4-diazabicyclo[2.2.2]octane), the quaternary hydroxyalkylammonium hydroxides known from EP-A 37 65 or EP-A 10 589, for example N,N,N-trimethyl-N-(2-hydroxyethyl)ammonium hydroxide, the trialkylhydroxylalkylammonium carboxylates that are known from DE-A 2631733, EP-A 0 671 426, EP-A 1 599 526 and U.S. Pat. No. 4,789,705, for example N,N,N-trimethyl-N-2-hydroxypropylammonium p-tert-butylbenzoate and N,N,N-trimethyl-N-2-hydroxypropylammonium 2-ethylhexanoate, the quaternary benzylammonium carboxylates known from EP-A 1 229 016, such as N-benzyl-N,N-dimethyl-N-ethylammonium pivalate, N-benzyl-N,N-dimethyl-N-ethylammonium 2-ethylhexanoate, N-benzyl-N,N,N-tributylammonium 2-ethylhexanoate, N,N-dimethyl-N-ethyl-N-(4-methoxybenzyl)ammonium 2-ethylhexanoate or N,N,N-tributyl-N-(4-methoxybenzyl) ammonium pivalate, the tetrasubstituted ammonium α-hydroxycarboxylates known from WO 2005/087828, for example tetramethylammonium lactate, the quaternary ammonium or phosphonium fluorides known from EP-A 0 339 396, EP-A 0 379 914 and EP-A 0 443 167, for example N-methyl-N,N,N-trialkylammonium fluorides with $C_8$-$C_{10}$-alkyl radicals, N,N,N,N-tetra-n-butylammonium fluoride, N,N,N-trimethyl-N-benzylammonium fluoride, tetramethylphosphonium fluoride, tetraethylphosphonium fluoride or tetra-n-butylphosphonium fluoride, the quaternary ammonium and phosphonium polyfluorides known from EP-A 0 798 299, EP-A 0 896 009 and EP-A 0 962 455, for example benzyltrimethylammonium hydrogen polyfluoride, the tetraalkylammonium alkylcarbonates which are known from EP-A 0 668 271 and are obtainable by reaction of tertiary amines with dialkyl carbonates, or betaine-structured quaternary ammonioalkyl carbonates, the quaternary ammonium hydrogencarbonates known from WO 1999/023128, such as choline bicarbonate, the quaternary ammonium salts which are known from EP 0 102 482 and are obtainable from tertiary amines and alkylating esters of phosphorus acids, examples of such salts being reaction products of triethylamine, DABCO or N-methylmorpholine with dimethyl methanephosphonate, or the tetrasubstituted ammonium salts of lactams that are known from WO 2013/167404, for example trioctylammonium caprolactamate or dodecyltrimethylammonium caprolactamate.

Further trimerization catalysts suitable for the process of the invention can be found, for example, in J. H. Saunders and K. C. Frisch, Polyurethanes Chemistry and Technology, p. 94 ff. (1962) and the literature cited therein.

The catalysts B) can be used in the process of the invention either individually or in the form of any desired mixtures with one another.

Preferred catalysts B) are metal compounds of the aforementioned type, especially carboxylates and alkoxides of alkali metals, alkaline earth metals or zirconium, in combination with complexing agents such as crown ethers or polyethylene glycols or polypropylene glycols, and organic tin compounds of the type mentioned.

Particularly preferred trimerization catalysts B) are sodium and potassium salts of aliphatic carboxylic acids having 2 to 20 carbon atoms in combination with complexing agents such as crown ethers or polyethylene glycols or polypropylene glycols, and aliphatically substituted tin compounds.

Very particularly preferred trimerization catalysts B) for the process of the invention are potassium acetate in combination with complexing agents such as crown ethers or polyethylene glycols or polypropylene glycols, tin octoate and/or tributyltin oxide.

According to the invention, the trimerization catalyst B) is generally used in a concentration based on the amount of the polyisocyanate composition A) used of 0.0005% to 5.0% by weight, preferably of 0.0010% to 2.0% by weight and more preferably of 0.0015% to 1.0% by weight.

The trimerization catalysts B) that are used in accordance with the invention generally have sufficient solubility in the polyisocyanate composition A) in the amounts that are required for initiation of the trimerization reaction. The catalyst B) is therefore preferably added to the polyisocyanate composition A) in neat form.

Optionally, however, the catalysts B) can also be used dissolved in a suitable organic solvent to improve their incorporability. The dilution level of the catalyst solutions can be freely selected within a very wide range. Catalytically active catalyst solutions are typically those of a concentration over and above about 0.01% by weight.

Suitable catalyst solvents are, for example, solvents that are inert toward isocyanate groups, for example hexane, toluene, xylene, chlorobenzene, ethyl acetate, butyl acetate, diethylene glycol dimethyl ether, dipropylene glycol dimethyl ether, ethylene glycol monomethyl or monoethyl ether acetate, diethylene glycol ethyl and butyl ether acetate, propylene glycol monomethyl ether acetate, 1-methoxyprop-2-yl acetate, 3-methoxy-n-butyl acetate, propylene glycol diacetate, acetone, methyl ethyl ketone, methyl isobutyl ketone, cyclohexanone, lactones such as β-propiolactone, γ-butyrolactone, ε-caprolactone and ε-methylcaprolactone, but also solvents such as N-methylpyrrolidone and N-methylcaprolactam, 1,2-propylene carbonate, methylene chloride, dimethyl sulphoxide, triethyl phosphate or any desired mixtures of such solvents.

If catalyst solvents are used in the method according to the invention, preference is given to using catalyst solvents which bear groups reactive toward isocyanates and can be incorporated into the polyisocyanurate plastic. Examples of such solvents are mono- and polyhydric simple alcohols, for example methanol, ethanol, n-propanol, isopropanol, n-butanol, n-hexanol, 2-ethyl-1-hexanol, ethylene glycol, propylene glycol, the isomeric butanediols, 2-ethylhexane-1,3-diol or glycerol; ether alcohols, for example 1-methoxy-2-propanol, 3-ethyl-3-hydroxymethyloxetane, tetrahydrofurfuryl alcohol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol, dipropylene glycol or else liquid higher molecular weight polyethylene glycols, polypropylene glycols, mixed polyethylene/polypropylene glycols and the monoalkyl ethers thereof; ester alcohols, for example ethylene glycol monoacetate, propylene glycol monolaurate, glycerol mono- and diacetate, glycerol monobutyrate or 2,2,4-trimethylpentane-1,3-diol monoisobutyrate; unsaturated alcohols, for example allyl alcohol, 1,1-dimethyl allyl alcohol or oleyl alcohol; araliphatic alcohols, for example benzyl alcohol; N-monosubstituted amides, for example N-methylformamide, N-methylacetamide, cyanoacetamide or 2-pyrrolidone, or any desired mixtures of such solvents.

The polyisocyanurate plastics of the invention even as such, i.e. without addition of appropriate auxiliaries and additives C), feature very good light stability. Nevertheless, it is optionally possible to use standard auxiliaries and/or additives C) as well in the production thereof, for example standard fillers, UV stabilizers, antioxidants, mould release agents, water scavengers, slip additives, defoamers, levelling agents, rheology additives, plasticizers, flame retardants and/or pigments. These auxiliaries and/or additives C), excluding fillers and flame retardants, are typically present in the polyisocyanurate plastic in an amount of less than 10% by weight, preferably less than 5% by weight, more preferably up to 3% by weight, based on the polyisocyanate composition A). Flame retardants are typically present in the polyisocyanurate plastic in amounts of not more than 70% by weight, preferably not more than 50% by weight and more preferably not more than 30% by weight, calculated as the total amount of flame retardants used, based on the polyisocyanate composition A).

Suitable fillers $C_w$) are, for example $AlOH_3$, $CaCO_3$, metal pigments such as $TiO_2$ and further known standard fillers. More particularly, fillers used are those which do not significantly impair the transparency of the polyisocyanurate plastic, for example fillers having a particle size below the wavelength of visible light. Likewise particularly suitable are fillers having inherent transparent properties, for example hollow glass beads or glass beads. Suitable fillers $C_w$) are preferably used in amounts of not more than 70% by weight, preferably not more than 50% by weight and more preferably not more than 30% by weight, calculated as the total amount of fillers used, based on the polyisocyanate composition A).

Suitable UV stabilizers $C_x$) may preferably be selected from the group consisting of piperidine derivatives, for example 4-benzoyloxy-2,2,6,6-tetramethylpiperidine, 4-benzoyloxy-1,2,2,6,6-pentamethylpiperidine, bis(2,2,6,6-tetramethyl-4-piperidyl) sebacate, bis(1,2,2,6,6-pentamethyl-1-4-piperidinyl) sebacate, bis(2,2,6,6-tetramethyl-4-piperidyl) suberate, bis(2,2,6,6-tetramethyl-4-piperidyl) dodecanedioate; benzophenone derivates, for example 2,4-dihydroxy-, 2-hydroxy-4-methoxy-, 2-hydroxy-4-octoxy-, 2-hydroxy-4-dodecyloxy- or 2,2'-dihydroxy-4-dodecyloxybenzophenone; benzotriazole derivatives, for example 2-(2H-benzotriazol-2-yl)-4,6-d i-tert-pentyl phenol, 2-(2H-benzotriazol-2-yl)-6-dodecyl-4-methyl phenol, 2-(2H-benzotriazol-2-yl)-4,6-bis(1-methyl-1-phenylethyl)phenol, 2-(5-chloro-2H-benzotriazol-2-yl)-6-(1,1-dimethylethyl)-4-methylphenol, 2-(2H-benzotriazol-2-yl)-4-(1,1,3,3-tetramethylbutyl)phenol, 2-(2H-benzotriazol-2-yl)-6-(1-methyl-1-phenylethyl)-4-(1,1,3,3-tetramethylbutyl)phenol, isooctyl 3-(3-(2H-benzotriazol-2-yl)-5-(1,1-dimethylethyl)-4-hydroxyphenylpropionate), 2-(2H-benzotriazol-2-yl)-4,6-bis (1,1-dimethylethyl)phenol, 2-(2H-benzotriazol-2-yl)-4,6-bis (1-methyl-1-phenylethyl)phenol, 2-(5-chloro-2H-benzotriazol-2-yl)-4,6-bis(1,1-dimethylethyl)phenol; oxalanilides, for example 2-ethyl-2'-ethoxy- or 4-methyl-4'-methoxyoxalanilide; salicylic esters, for example phenyl salicylate, 4-tert-butylphenyl salicylate, 4-tert-octylphenyl salicylate; cinnamic ester derivatives, for example methyl α-cyano-β-methyl-4-methoxycinnamate, butyl α-cyano-μ-methyl-4-methoxycinnamate, ethyl α-cyano-μ-phenylcinnamate, isooctyl α-cyano-μ-phenylcinnamate; and malonic ester derivatives, such as dimethyl 4-methoxybenzylidenemalonate, diethyl 4-methoxybenzylidenemalonate, dimethyl 4 butoxybenzylidenemalonate. These preferred light stabilizers can be used either individually or in any desired combinations with one another.

Particularly preferred UV stabilizers $C_x$) for the polyisocyanurate plastics producible in accordance with the invention are those which fully absorb light of wavelength <400 nm. These include, for example, the benzotriazole derivatives mentioned. Especially preferred UV stabilizers are 2-(5-chloro-2H-benzotriazol-2-yl)-6-(1,1-dimethylethyl)-4-methylphenol, 2-(2H-benzotriazol-2-yl)-4-(1,1,3,3-tetramethylbutyl)phenol and/or 2-(5-chloro-2H-benzotriazol-2-yl)-4,6-bis(1,1-dimethylethyl)phenol.

It is optionally possible to add one or more of the UV stabilizers $C_x$) mentioned by way of example to the polyisocyanate composition A), preferably in amounts of 0.001% to 3.0% by weight, more preferably 0.01% to 2% by weight, calculated as the total amount of UV stabilizers used, based on the total weight of the polyisocyanate composition A).

Suitable antioxidants $C_y$) are preferably sterically hindered phenols, which may be selected preferably from the group consisting of 2,6-di-tert-butyl-4-methylphenol (ionol), pentaerythritol tetrakis(3-(3,5-di-tert-butyl-4-hydroxyphenyl)propionate), octadecyl 3-(3,5-di-tert-butyl-4-hydroxyphenyl)propionate, triethylene glycol bis(3-tert-butyl-4-hydroxy-5-methylphenyl)propionate, 2,2'-thiobis(4-methyl-6-tert-butylphenol) and 2,2'-thiodiethyl bis[3-(3,5-di-tert-butyl-4-hydroxyphenyl)propionate]. If required, they can be used either individually or in any desired combinations with one another.

These antioxidants $C_y$) are preferably used in amounts of 0.01% to 3.0% by weight, more preferably 0.02% to 2.0% by weight, calculated as the total amount of antioxidants used, based on the polyisocyanate composition A).

Apart from the small amounts of any catalyst solvents for use in addition, the polyisocyanurate plastics of the invention are produced without solvent. Suitable solvents would otherwise, for example, be the catalyst solvents that are inert toward isocyanate groups and have already been described above.

In the case of the use according to the invention, further auxiliaries and additives C) added, finally, may also be internal mould release agents $C_z$).

These are preferably the nonionic surfactants containing perfluoroalkyl or polysiloxane units that are known as mould release agents, quaternary alkylammonium salts, for example trimethylethylammonium chloride, trimethylstearylammonium chloride, dimethylethylcetylammonium chloride, triethyldodecylammonium chloride, trioctylmethylammonium chloride and diethylcyclohexyldodecylammonium chloride, acidic monoalkyl and dialkyl phosphates having 2 to 18 carbon atoms in the alkyl radical, for example ethyl phosphate, diethyl phosphate, isopropyl phosphate, diisopropyl phosphate, butyl phosphate, dibutyl phosphate, octyl phosphate, dioctyl phosphate, isodecyl phosphate, diisodecyl phosphate, dodecyl phosphate, didodecyl phosphate, tridecanol phosphate, bis(tridecanol) phosphate, stearyl phosphate, distearyl phosphate, and any desired mixtures of such mould release agents.

Particularly preferred mould release agents $C_z$) are the acidic mono- and dialkyl phosphates mentioned, most preferably those having 8 to 12 carbon atoms in the alkyl radical.

Internal mould release agents $C_z$) are used in the process of the invention, if appropriate, preferably in amounts of 0.01% to 3.0% by weight, more preferably 0.02% to 2.0% by weight, calculated as the total amount of internal mould release agent used, based on the polyisocyanate composition A).

In one embodiment of the process of the invention, a trimerization catalyst B) or a mixture of different trimerization catalysts B) is added to the polyisocyanate composition A) described, optionally under inert gas, for example nitrogen, and optionally with additional use of the aforementioned solvents and auxiliaries and additives C), and mixed in homogeneously with the aid of a suitable mixing unit. The addition of catalyst B) and any solvent and auxiliaries and additives C) for additional use can take place in any sequence, successively or in a mixture, in the above-specified amounts and generally at a temperature of 0 to 150° C., preferably of 15 to 80° C., more preferably of 20 to 60° C. In a particular embodiment of the invention, the reaction mixture thus obtained has a pot life, defined as the time span from the mixing of the polyisocyanate composition A) with the trimerization catalyst B) until the time at which the viscosity of the reaction mixture is twice the starting value, of greater than 10 min at room temperature. This assures both reliable miscibility and reliable and simple processing without the risk of a reaction that proceeds in an uncontrolled manner with significant evolution of heat.

Optionally, the feedstocks are dried and degassed by suitable methods prior to mixing, in order to avoid unwanted side reactions and blister formation.

In the process of the invention, it is advantageous when the polyisocyanate composition A) and optionally the further components are mixed in anhydrous form, since small amounts of moisture can lead to blister formation. The residual water content in the mixture should therefore be kept sufficiently low that no defects occur. Preferably, the water content of the mixture may be <0.5% by weight.

The application of the catalysed reaction mixtures thus obtained can be effected by different methods known per se according to the end use. For production of films or coatings, for example paints, reaction mixtures comprising the catalyst B) and the polyisocyanate composition A) can be applied, for example, by spraying, spreading, dipping or flow-coating or with the aid of brushes, rollers or doctor blades, in one or more layers to any desired substrates, for example metal, glass, ceramic materials, hard and flexible plastics or else siliconized paper, which may optionally also be provided with standard primers prior to the coating.

For production of solid bodies, for example semi-finished products or mouldings, reaction mixtures comprising the catalyst B) and the polyisocyanate composition A) may be introduced into open or closed moulds, for example by simple manual pouring, or with the aid of suitable machinery, for example the low-pressure or high-pressure machinery which is standard in polyurethane technology.

Subsequently, the trimerization reaction can be started by heating, the optimal reaction temperature, depending on the catalyst chosen in each case, being 0 to 250° C., preferably from 40 to 200° C., more preferably from 100 to 190° C. Particularly advantageously, the polymerization can be conducted at temperatures above the glass transition point of the desired products. In a particular embodiment of the invention, the temperature of the reaction mixture in the course of the reaction reaches more than 80° C. but remains below 350 and preferably below 300° C.

Especially in the case of thick-layered mouldings, the reaction temperature has an adiabatic component which can lead to temperature spikes in the reaction material of +5 to +200° C. and preferably +10 to 100 compared to the set reaction temperature (i.e. ambient temperature). The adiabatic component is understood to mean the reaction enthalpy which is not released to the environment by a heat transfer but leads to a temperature increase and acceleration of the reaction in the trimerization mixture.

Depending on the catalyst B) chosen and the reaction temperature chosen, the trimerization reaction is very substantially complete, as defined below, after a period of a few seconds up to several hours. In practice, it has been found that the trimerization reaction at reaction temperatures of greater than 80° C. is typically very substantially complete within less than 12 h. When "reaction temperatures" are being discussed here, this means the ambient temperature. In a preferred embodiment of the invention, the trimerization reaction at a reaction temperature of greater than 80° C. is complete within fewer than 12 h, more preferably fewer than 5 h and most preferably fewer than 1 h. The progress of the reaction can initially still be determined by titrimetric determination of the NCO content, but gelation and solidification of the reaction mixture sets in rapidly with advancing conversion, which makes wet-chemical analysis methods impossible. The further conversion of isocyanate groups can then only be monitored by spectroscopic methods, for example by IR spectroscopy with reference to the intensity of the isocyanate band at about 2270 cm$^{-1}$.

The polyisocyanurate plastics of the invention are preferably polyisocyanurates with high conversion, i.e. those in which the trimerization reaction to give polyisocyanurate structures is very substantially complete. A trimerization reaction to give polyisocyanurate structures can be regarded as "very substantially complete" in the context of the present invention when at least 80%, preferably at least 90% and more preferably at least 95% of the free isocyanate groups originally present in the polyisocyanate composition A) have reacted. In other words, preferably only at most 20%, at most 10% and more preferably at most 5% of the isocyanate groups originally present in the polyisocyanate composition A) are present in the polyisocyanurate plastic of the invention. This can be achieved by conducting the catalytic trimerization in the process of the invention at least up to a conversion level at which only, for example, at most 20% of isocyanate groups originally present in the polyisocyanate composition A) are present, such that a polyisocyanurate with high conversion is obtained. The percentage of isocyanate groups still present can be determined by a comparison of the content of isocyanate groups in % by weight in the original polyisocyanate composition A) with the content of isocyanate groups in % by weight in the reaction product, for example by the aforementioned comparison of the intensity of the isocyanate band at about 2270 cm$^{-1}$ by means of IR spectroscopy.

In a preferred embodiment, the total content of extractable isocyanate-containing compounds in the polyisocyanurate plastic of the invention, based on the polyisocyanate composition A) used, is less than 1% by weight. The total content of extractable isocyanate-containing compounds can be determined in a particularly practicable manner by methods known per se, preferably by extraction with suitable solvents that are inert toward isocyanate groups, for example aliphatic or cycloaliphatic hydrocarbons such as pentane, hexane, heptane, cyclopentane or cyclohexane and subsequent determination of the isocyanate group content in the extract, for example by IR spectroscopy.

The process of the invention differs in this respect from the very exothermic prior art processes, in which the significant evolution of heat results in foam formation and discolouration, which greatly reduce transmittance. High transmittance and low discolouration is required for use in many transparent elements.

With the process of the invention, it is possible in a very efficient manner to obtain homogeneous, blister-free polyisocyanurate plastics. These especially feature a density of greater than 1 g/cm$^3$, determined in accordance with DIN EN ISO 1183-1.

The polyisocyanurate plastics of the invention have an unusually high thermal stability and, in particular, thermal colour stability.

In a further preferred embodiment, the polyisocyanurate plastics of the invention have a transmittance at a layer thickness of 2 mm of greater than 70%, preferably greater than 80% and more preferably greater than 90%, determined in accordance with ASTM D-1003.

More particularly, the polyisocyanurate plastics also have a transmittance loss (determination at 360 nm and 400 nm) on storage at 120° C. in an oven for 1000 h of ≤30%, preferably ≤20%. To determine the transmittance loss, the transmittance is determined directly after production (T0) and after storage in an oven at 120° C. for 1000 h (T1000) with a Hunter UltraScanPro 1206 over the wavelength range of 360-840 nm. The transmittance loss T % is calculated as T %=T0−T1000. The transmittance loss is calculated separately for the wavelengths of 360 nm and 400 nm. More particularly, the transmittance loss determined at 360 nm and 400 nm after 1000 h at 120° C. is ≤30%, preferably ≤20%.

In another preferred embodiment, the polyisocyanurate plastics of the invention have a b* value determined in accordance with DIN 5033 in the L*a*b* colour space of less than 15, preferably less than 10. More particularly, the polyisocyanurate plastics of the invention also have a delta b* value determined in accordance with DIN 5033 (determination of the b* value) in the L*a*b* colour space of ≤20, preferably ≤15, more preferably 10. Every colour in the L*a*b* colour space is defined by a colour locus having the Cartesian coordinates {L*, a*, b*}. The L* axis describes the brightness (luminance) of the colour with values of 0 to 100. The a* axis describes the green or red component of a colour, negative values representing green and positive values representing red. The b* axis describes the blue or yellow component of a colour, negative values representing blue and positive values representing yellow. Relatively high positive b* values therefore indicate significant yellowing which is unwanted for many applications. The delta b* value is the difference between the b* value for the polyisocyanurate plastic which is determined directly after the production (b0*) and the b* value which is determined after storage in an oven at 120° C. for 1000 h (b1000*) (delta b*=b1000*−b0*). A significant increase in the b* value and hence a high delta b* value thus represents significant thermal yellowing.

In addition, the polyisocyanurate plastics of the invention, by the method described in the experimental section, have Shore D hardnesses of more than 40, preferably 50, more preferably 60, to DIN 53505.

The invention further provides a transparent element comprising or consisting of a polyisocyanurate plastic of the invention.

Transparent elements in the context of this invention are understood to mean, for example, clearcoats, films, vessels, packaging materials, glazing materials, encapsulation materials, optical fibres, light diffusers or lenses, and any mouldings or semi-finished products that are transparent. The elements can be used in a wide variety of different fields and applications which require particularly good thermal durability and thermal colour stability.

The transparent elements of the invention can be produced by various production methods, for example casting, dripping, rapid injection moulding (RIM), coating, dipping or other suitable methods.

Preferably, the transparent element may be an optical fibre, a light diffuser or a lens.

A specific configuration of the invention involves optical elements.

Examples of transparent optical elements may be lenses in automobile headlamps, optical correction lenses, optical fibres, encapsulations of lighting means, especially of LEDs with optionally incorporated fluorescent materials (typically referred to as "phosphors" in industry) or other transparent components.

The invention likewise encompasses the use of a polyisocyanurate plastic of the invention for light conduction, light scattering and/or light guiding.

The invention is elucidated in detail hereinafter by examples.

EXAMPLES

All percentages are based on weight, unless stated otherwise.

The methods detailed hereinafter for determination of the appropriate parameters are employed for conduction and evaluation of the examples and are also the methods for determination of the parameters of relevance in accordance with the invention in general.

The NCO contents are determined by titrimetric means to DIN EN ISO 11909.

The residual monomer contents are measured to DIN EN ISO 10283 by gas chromatography with an internal standard.

All the viscosity measurements are made with a Physica MCR 51 rheometer from Anton Paar Germany GmbH (DE) to DIN EN ISO 3219.

The densities of the starting polyisocyanates are determined to DIN EN ISO 2811, and those of the cured polyisocyanurate plastics to DIN EN ISO 1183-1.

The contents (mol %) of the uretdione, isocyanurate, allophanate, biuret, iminooxadiazinedione and/or oxadiazinetrione structures present in the starting polyisocyanates are calculated from the integrals of proton-decoupled $^{13}$C NMR spectra (recorded on a Bruker DPX-400 instrument) and are each based on the sum total of uretdione, isocyanurate, allophanate, biuret, iminooxadiazinedione and/or oxadiazinetrione structures present. In the case of HDI polyisocyanates, the individual structural elements have the following chemical shifts (in ppm): uretdione: 157.1; isocyanurate: 148.4; allophanate: 155.7 and 153.8, biuret: 155.5; iminooxadiazinedione: 147.8, 144.3 and 135.3; oxadiazinetrione: 147.8 and 143.9.

The b* value is determined according to DIN 5033 in the L*a*b* colour space. The delta b* value is the difference between the b* value for the polyisocyanurate plastic which is determined directly after the production (b0*) and the b* value which is determined after storage in an oven at 120° C. for 1000 h (b1000*) (delta b*=b1000*−b0*). A significant increase in the b* value and hence a high delta b* value thus represents significant thermal yellowing and hence low thermal colour stability.

Discolorations were measured in accordance with DIN 5033 Part 7 on a CM-5 spectrophotometer using specimens of thickness 2 mm without gloss at a viewing angle of 8° and with diffuse illumination.

Transmittance was measured with a Byk-Gardner hazegard plus instrument according to ASTM D1003 on specimens of thickness of 2 mm.

To determine the transmittance loss, the transmittance is determined directly after production (T0) and after storage in an oven at 120° C. for 1000 h (T1000) with a Hunter UltraScanPro 1206 over the wavelength range of 360-840 nm. The transmittance loss T % is calculated as T %=T0–T1000. The transmittance loss is calculated separately for the wavelengths of 360 nm and 400 nm.

The glass transition temperature $T_g$ was determined by means of DSC (differential scanning calorimetry) with a Mettler DSC 12E (Mettler Toledo GmbH, Giessen, Germany) in accordance with DIN EN 61006. Calibration was effected via the melt onset temperature of indium and lead. 10 mg of substance were weighed out in standard capsules. The measurement was effected by three heating runs from −50° C. to +200° C. at a heating rate of 20 K/min with subsequent cooling at a cooling rate of 320 K/min. Cooling was effected by means of liquid nitrogen. The purge gas used was nitrogen. The values reported in the table below are each based on the evaluation of the 1st heating curve, since changes in the sample in the measurement process at high temperatures are possible in the reactive systems being examined as a result of the thermal stress in the DSC. The glass transition temperature $T_g$ determined was the temperature at half the height of a glass transition step. Shore hardnesses were measured to DIN 53505 with the aid of a Zwick 3100 Shore hardness tester (from Zwick, Germany) at 23° C. and 50% air humidity.

Process of the Invention 100 g of the starting polyisocyanate are weighed into a polypropylene cup together with a catalyst mixture consisting of 0.177 g of potassium acetate, 0.475 g of [18]crown-6 and 3.115 g of diethylene glycol, and homogenized at 2750 rpm with the aid of a Speed-Mixer DAC 150 FVZ (from Hauschild, Germany) for 1 min. 8 g of the contents of each polypropylene cup are weighed into an aluminium dish of diameter 6.3 cm and depth 1 cm which, for better demoulding, had previously been rubbed with 1% soya lecithin W250 in ethyl acetate solution and dried. The aluminium dish thus filled is heated in a drying cabinet at 180° C. for 10 min. After cooling to room temperature, the test specimen is demoulded. Test specimens of thickness about 2 mm are obtained.

The process of the invention is employed both for production of inventive and noninventive polyisocyanurate plastics.

All the polyisocyanates used are sourced from Bayer and are either commercially available or can be prepared by methods described in the patent literature on the basis of readily available monomers and catalysts.

After production, the test specimens are stored in an oven at 120° C. over a period of 1000 h. To assess the stability, a transmittance spectrum of the test specimens is recorded prior to storage and after storage for 1000 h. For this purpose, a Hunter UltraScanPro 1206 is used to determine the transmittance over the wavelength range of 360-840 nm.

Starting Compounds
Inventive Starting Polyisocyanate A

HDI polyisocyanate containing isocyanurate groups, prepared in accordance with Example 11 of EP-A 330 966, with the alteration that the catalyst solvent used was 2-ethylhexanol rather than 2-ethylhexane-1,3-diol. The reaction was stopped at an NCO content of the crude mixture of 42% by adding dibutyl phosphate. Subsequently, unconverted HDI was removed by thin-film distillation at a temperature of 130° C. and a pressure of 0.2 mbar.
NCO content: 23.0%
NCO functionality: 3.2
Monomeric HDI: 0.1%
Viscosity (23° C.): 1200 mPas
Density (20° C.): 1.17 g/cm$^3$
Distribution of the oligomeric structure types:
Isocyanurate: 89.7 mol %
Iminooxadiazinedione: 2.5 mol %
Uretdione: 2.7 mol %
Allophanate: 5.1 mol %

Inventive Starting Polyisocyanate B

HDI polyisocyanate containing isocyanurate groups, prepared in accordance with Example 11 of EP-A 330 966, with the alteration that the catalyst solvent used was 2-ethylhexanol rather than 2-ethylhexane-1,3-diol. The reaction was stopped at an NCO content of the crude mixture of 45% by adding dibutyl phosphate. Subsequently, unconverted HDI was removed by thin-film distillation at a temperature of 130° C. and a pressure of 0.2 mbar.
NCO content: 21.8%
NCO functionality: 3.4
Monomeric HDI: 0.1%
Viscosity (23° C.): 3000 mPas
Density (20° C.): 1.17 g/cm$^3$
Distribution of the oligomeric structure types:
Isocyanurate: 89.7 mol %
Iminooxadiazinedione: 2.5 mol %
Uretdione: 2.7 mol %
Allophanate: 5.1 mol %

Inventive Starting Polyisocyanate C

Isophorone diisocyanate (IPDI), in accordance with Example 2 of EP-A 0 003 765, was trimerized down to an NCO content of 31.1% and the excess IPDI was removed by thin-film distillation at 170° C./0.1 mbar. This gave an isocyanurate polyisocyanate as a virtually colourless solid resin having a melting range of 100 to 110° C.
NCO content: 16.4%
NCO functionality: 3.3
Monomeric IPDI: 0.2%

70 parts by weight of the solid IPDI polyisocyanurate were coarsely comminuted and initially charged in a reaction vessel at room temperature together with 30 parts by weight of the starting polyisocyanate A under an N2 atmosphere. To dissolve the solid resin and homogenize the mixture, it was heated to 100-140° C. and stirred until a virtually clear solution was obtained. Subsequently, the mixture was cooled to 50° C. and filtered through a 200µ filter.
NCO content: 21.2%
NCO functionality: 3.2
Monomeric IPDI: 0.1%
Monomeric HDI: 0.1
Distribution of the oligomeric structure types:
Isocyanurate: 92.1 mol %
Iminooxadiazinedione: 1.8 mol %
Uretdione: 1.9 mol %
Allophanate: 4.2 mol %

Inventive Starting Polyisocyanate D
The starting polyisocyanate D used was a mixture of 95% by weight of starting polyisocyanate A and 5% by weight of Isophorone diisocyanate (IPDI).
Inventive Starting Polyisocyanate E
The starting polyisocyanate A used was distilled to yield a fraction with >99% polyisocyanurate trimer of HDI according to $^{13}C$ NMR spectroscopy. NCO content: 24.8
NCO functionality: 3.0
Monomeric HDI: <0.1%
Viscosity (23° C.): 700 mPas
Density (20° C.): 1.17 g/cm$^3$
Distribution of the oligomeric structure types:
Isocyanurate: 99.2 mol %
Iminooxadiazinedione+Uretdione+Allophanate: <1 mol %
Noninventive Starting Polyisocyanate F*
HDI polyisocyanate containing biuret groups, prepared in accordance with the process of EP-A 0 150 769 by reacting 8.2 mol of HDI with 1.0 mol of water in the presence of 0.05 mol of pivalic anhydride at a temperature of 125° C. On attainment of an NCO content of 36.6%, unconverted monomeric HDI was removed together with pivalic anhydride by thin-film distillation at a temperature of 130° C. and a pressure of 0.2 mbar.
NCO content: 23.0%
NCO functionality: 3.2
Monomeric HDI: 0.4%
Viscosity (23° C.): 2500 mPas
Density (20° C.): 1.13 g/cm$^3$
Distribution of the oligomeric structure types:
Biuret: 87.7 mol %
Uretdione: 12.3 mol %
Noninventive Starting Polyisocyanate G*
HDI polyisocyanate containing isocyanurate and uretdione groups, prepared by tributylphosphine-catalysed oligomerization in accordance with Example 1a) of EP-A 0 377 177, with the alteration that no 2,2,4-trimethylpentane-1,3-diol was used. The reaction was stopped at an NCO content of 42%, and unconverted HDI was removed by thin-film distillation at a temperature of 130° C. and a pressure of 0.2 mbar.
NCO content: 22.7%
NCO functionality: 2.2
Monomeric HDI: 0.3%
Viscosity (23° C.): 90 mPas
Density (20° C.): 1.13 g/cm$^3$
Distribution of the oligomeric structure types:
Isocyanurate: 15.6 mol %
Iminooxadiazinedione: 6.3 mol %
Uretdione: 78.1 mol %
Noninventive Starting Diisocyanate H*
Sourced from Bayer MaterialScience AG as Desmodur H=HDI=monomeric hexamethylene diisocyanate
Noninventive Starting Polyisocyanate I*
Purchased from Bayer Material Science as Desmodur XP 2617. Mainly linear polyisocyanat based on a polyurethane prepolymer of HDI.
NCO-content: 12.5%
Monomeric HDI: <0.5%
Viscosity (23° C.): 4250 mPas
Density (20° C.): 1.09 g/cm$^3$
Noninventive Starting Polyisocyanate J*
Allophanate- and isocyanurate group containing HDI-polyisocyanate, in accordance with example 1 of EP-A 496 208.
NCO-content: 19.8%
NCO-functionality: 2.5
Monomeric HDI: 0.3%
Viscosity (23° C.): 570 mPas
Density (20° C.): 1.11 g/cm$^3$
Distribution of oligomeric structures:
Isocyanurate: 33.1 mol-%
Allophanate: 66.9 mol-%

Comparative Experiments

The experiments based on the inventive polyisocyanate starting materials show distinctly better thermal ageing and thermal discolouration characteristics of the polyisocyanurate plastics obtained after thermal stress compared to the experiments based on the noninventive polyisocyanate starting materials. This is manifested in lower starting b* values (from the L* a* b* colour measurement) after production of the polyisocyanurate plastics, and in delta b* values of <20 and transmittance losses (T %) at 360 nm and 400 nm of <30% after 1000 h at 120° C.

The polyisocyanurate plastics of the invention based on inventive polyisocyanate starting materials accordingly exhibit much better properties for use as transparent elements for applications in which very good thermal properties and thermal discolouration properties are desired, for example in optical components for light scattering and light guiding, for example in the encapsulation of high-performance LEDs.

| Starting poly-iso-cyanate | Trans-mission/ % | Trans-mission/ % after aging 1000 h at 120° C. | b* value initial | b* after aging 1000 h at 120° C. | Unreacted isocyanate/% after cure for 10 min at 180° C. |
|---|---|---|---|---|---|
| A | 84.7 | 78.0 | 4.8 | 12.3 | <2 |
| B | 86.8 | 75.8 | 2.7 | 15.8 | <2 |
| C | 86.2 | 57.6 | 3.8 | 12.4 | <5 |
| D | 86.4 | 81.1 | 5.7 | 11.4 | <3 |
| E | 89.5 | 83.3 | 2.9 | 10.3 | <2 |
| F* | brown liquid | — | — | — | >20 |
| G* | brown liquid | — | — | — | >20 |
| H* | brown foam | — | — | — | <10 |
| I* | 89.8 | 63.4 | 17.4 | 83.2 | <5 |
| J* | 90.9 | 74.6 | 1.9 | 60.6 | <5 | comparative examples

Comparative examples F* and G* can not be trimerized sufficiently with the inventive method. The reaction in comparative example H* is so exothermic that the trimerization reaction concludes with the thermal decomposition reaction of the trimer and vaporization of the dimer resulting in a coloured foam.

Comparative example I* shows that typical isocyanat-terminated prepolymers containing polyether groups do not show the necessary color stability at relevant aging temperatures. Neither do products containing higher allophanate contents since allophanates seem to be instable at relevant aging temperatures for the inventive applications.

The invention claimed is:
1. A process for producing polyisocyanurate plastics, comprising the following steps:
   a) providing a polyisocyanate composition A) which contains oligomeric polyisocyanates and is low in monomeric diisocyanates, where the isocyanurate structure content in the polyisocyanate composition A) is at least 50 mol %, based on the sum total of the oligomeric structures from the group consisting of uretdione, isocyanurate, allophanate, biuret, iminoox- adiazinedione and oxadiazinetrione structure that are present in the polyisocyanate composition A);

b) catalytically trimerizing the polyisocyanate composition A).

2. The process according to claim 1, wherein the oligomeric polyisocyanates consist of one or more oligomeric polyisocyanates formed from 1,4-diisocyanatobutane, 1,5-diisocyanatopentane, 1,6-diisocyanatohexane, isophorone diisocyanate or 4,4'-diisocyanatodicyclohexylmethane or mixtures thereof or the polyisocyanate composition A) consists of at least 80% by weight, based on the weight of the polyisocyanate composition A), of polyisocyanates having exclusively aliphatically or cycloaliphatically bonded isocyanate groups and/or catalytic trimerization is accomplished using sodium salts or potassium salts of aliphatic carboxylic acids having 2 to 20 carbon atoms in combination with complexing agents.

* * * * *